United States Patent [19]

Yovanovich

[11] 3,755,046

[45] Aug. 28, 1973

[54] METHOD AND APPARATUS FOR COATING CYLINDRICAL PAPER PRODUCTS WITH A PLASTIC MATERIAL

[75] Inventor: Joseph T. Yovanovich, Rosemont, Pa.

[73] Assignee: Milton Berger, Philadelphia, Pa.; a part interest

[22] Filed: Aug. 3, 1971

[21] Appl. No.: 168,677

[52] U.S. Cl................. 156/429, 156/153, 156/195, 156/244, 156/425, 156/431, 156/500
[51] Int. Cl........................ B65h 81/04, B31c 3/00
[58] Field of Search................... 156/195, 244, 500, 156/425, 428, 429; 93/80, 83, 94; 264/173, 209; 425/131, 132, 133, 113, 461; 29/90

[56] References Cited
UNITED STATES PATENTS

| | | | |
|---|---|---|---|
| 3,430,543 | 3/1969 | Cunningham | 156/195 X |
| 2,810,424 | 10/1957 | Swartswelter et al. | 156/191 X |
| 2,467,642 | 4/1949 | Wilson et al. | 264/173 X |
| 2,513,106 | 6/1950 | Prendergast | 264/173 X |

Primary Examiner—Ralph S. Kendall
Assistant Examiner—David A. Simmons
Attorney—Louis V. Schiavo

[57] ABSTRACT

Method and apparatus are provided for continuously forming webs of paper stock freshly coated with adhesive into spiral tubing, reducing the tubing to a predetermined size before the adhesive dries, and thereafter extruding plastic material about the tubing for uniformly coating the same.

11 Claims, 8 Drawing Figures

Patented Aug. 28, 1973

INVENTOR
JOSEPH T. YOVANOVICH

BY Louis V Schiavo

ATTORNEY

FIG. 2.

INVENTOR
JOSEPH T. YOVANOVICH

FIG. 3.

INVENTOR
JOSEPH T. YOVANOVICH

FIG. 4.

Patented Aug. 28, 1973

INVENTOR
JOSEPH T. YOVANOVICH

BY *Torres & Schiavo*

ATTORNEY

INVENTOR
JOSEPH T. YOVANOVICH

ATTORNEY

METHOD AND APPARATUS FOR COATING CYLINDRICAL PAPER PRODUCTS WITH A PLASTIC MATERIAL

BACKGROUND OF THE INVENTION

1. Field of the Invention

This invention relates to method and apparatus for the continuous production of cylindrical paper products uniformly coated with plastic material.

2. Description of the Prior Art

In order to facilitate the handling of sheet material, and particularly very thin, flexible sheet material, it may be wound about a paper core of spriral tubing. Since irregularities in the surface of the core may damage the sheet material, it is common to provide the stock out of which the cores are made with an unbroken, uniform and smooth surface. The known way of doing this is by a batch type process. The spiral tubing is thoroughly dried. Next, it is impregnated with suitable plastic material. Then any of the plastic material extending above the surface of the spiral tubing is removed. This method of providing the spiral tubing with an unbroken, uniform and smooth surface is not entirely satisfactory because of the several separate and distinct steps involved, which make it very uneconomical.

SUMMARY OF THE INVENTION

A principal object of the present invention is to provide method and apparatus for the continuous production of cylindrical paper products coated with an unbroken, uniform and smooth layer of plastic material.

Another object of the present invention is to provide method and apparatus for continuously fabricating spiral tubing and extruding plastic material thereabout in coating relation to provide the same with an unbroken, uniform and smooth surface.

DESCRIPTION OF THE PREFERRED EMBODIMENT

The following description is directed to the specific embodiment of the invention disclosed in the drawings. It is not addressed to the scope of the invention, which may be practiced in a variey of forms.

Figure 1:
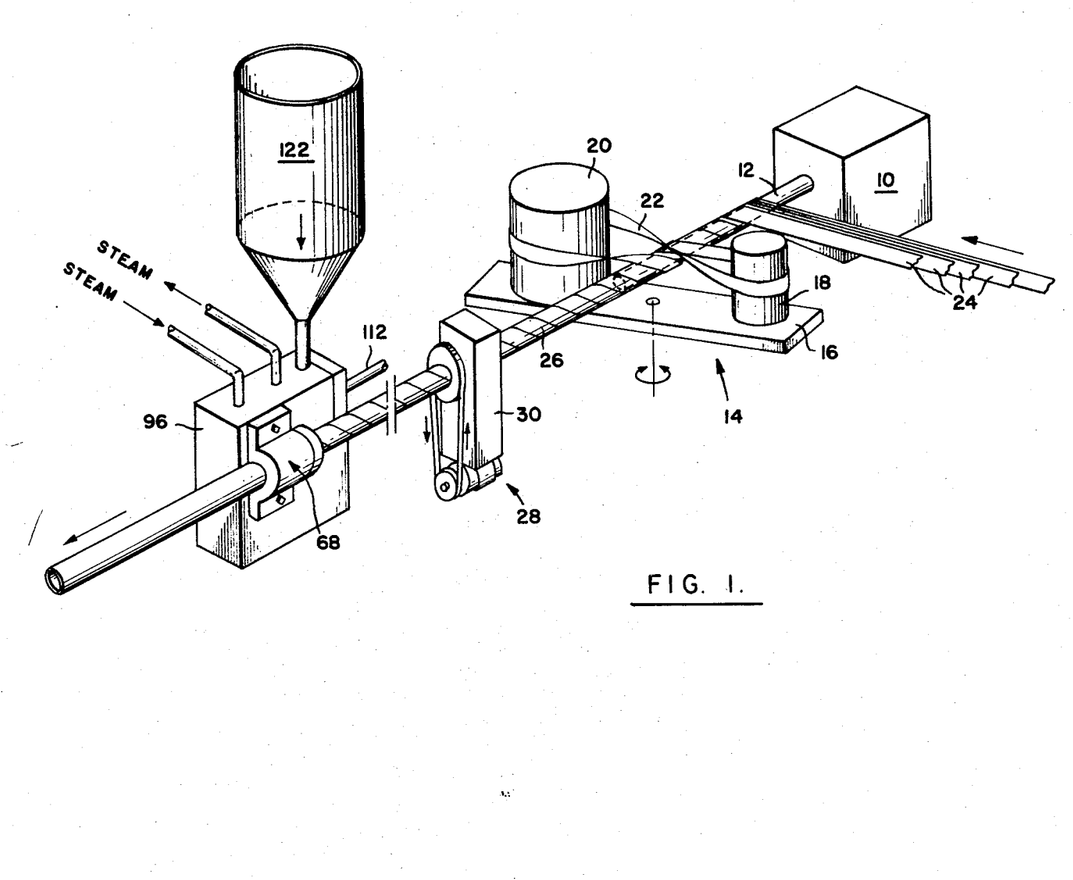
FIG. 1 is a perspective view schematically showing apparatus constructed in accordance with the present invention.

Apparatus constructed in accordance with the invention comprises a conventional spiral winding machine including an upright frame 10 which fixedly mounts a horizontally disposed mandrel 12 extending laterally therefrom, and a winding head 14 including a horizontally disposed arm 16 which revolvably mounts a pair of upright drums 18 and 20 disposed respectively on opposite sides of the mandrel 12, and a winding belt 22 trained about both drums and the mandrel, as shown.

A plurality of jute board webs 24 suitably coated with glue are drawn by the belt 22 from a source thereof (not shown) and spirally wound about the mandrel 12 to form cylindrical tubing 26. The belt frictionally grips the tubing and turns it about the mandrel while simultaneously advancing it in one continuous length as it is formed. The operation of spiral tube winding machinery is well known to those skilled in the art, as a consequence of which it is deemed unnecessary to described the same in greater detail. However, it should be noted that in practice the jute board webs 24 may vary in thickness from 8 percent under to 8 percent over a given desired thickness, as a consequence of which while the inside diameter of the tubing will conform closely to the outside diameter of the mandrel the outside diameter of the tubing may vary substantially from the desired outside diameter thereof. The variance depends upon uniformity or lack of uniformity in web thickness.

Figure 2:
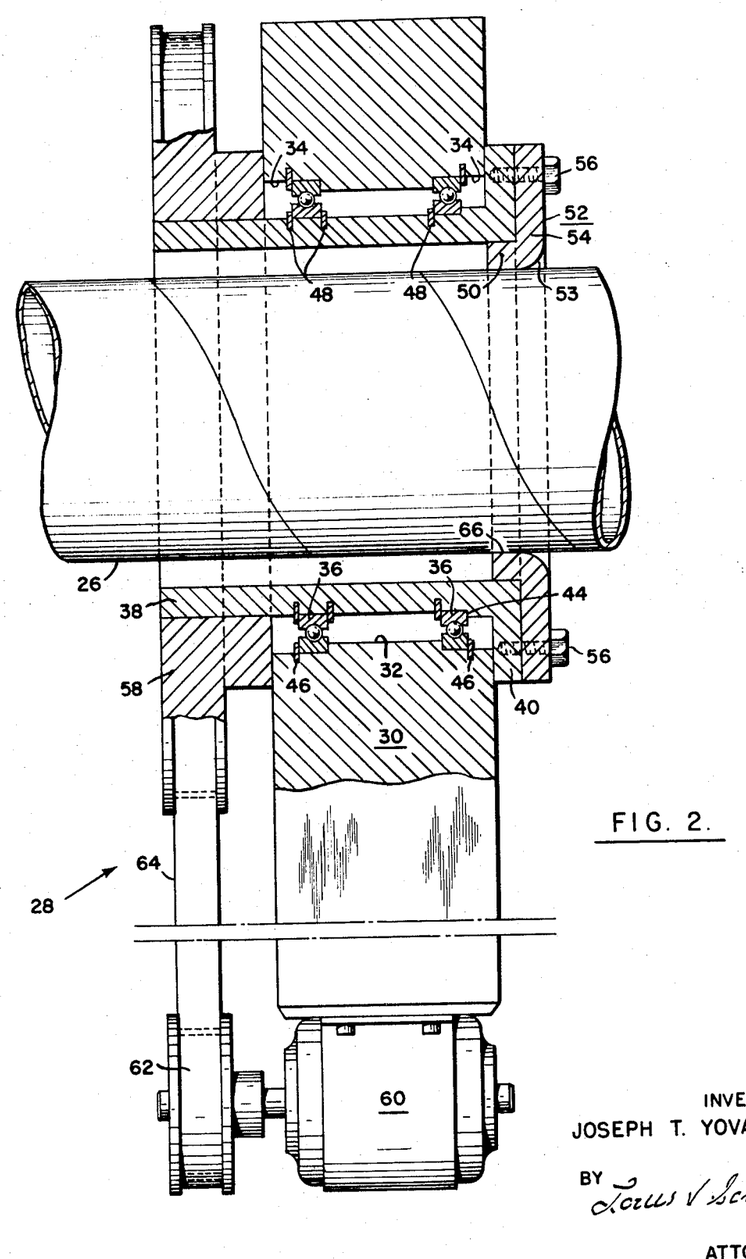
FIG. 2 is a vertical section through the tube sizing means shown in FIG. 1.

A substantial distance downstream from the mandrel 12 (in the order of 7 feet) is a unit or means 28 for receiving the tubing 26 as it comes off the mandrel and reducing it to a predetermined outside diameter. The unit 28 comprises a frame or post 30 which may be affixed to the frame (not shown) of the spiral tube winding machine. Referring particularly to FIG. 2, the post 30 is provided with a through bore 32 counterbored at both ends, as at 34, for accommodating a pair of axially spaced ball bearing units 36. Extending through the ball bearing units 36 is a cylindrical sleeve 38 provided with a radially outwardly extending flange 40 which abuts the upstream face of the post. The sleeve may be shouldered, as at 44, and split rings 46 and 48 may be provided for axially fixing the bearings 36 and the sleeve 38 relative to the post. Removably telescoped into the upstream end of the sleeve 38 is the axially extending cylindrical main body portion 50 of a collar 52 provided with a radially outwardly extending flange 54 overlying the flange 40 and detachably affixed thereto by studs 56. The main body portion 50 is axially rounded, as at 53. Mounted upon the downstream end of the sleeve 38 is a pulley 58 provided with a hub which abuts the downstream face of the post, and mounted upon a variable speed electric motor 60 carried by the post is a pulley 62.

The tubing 26 may come off the mandrel and pass through the collar 52 at the rate of approximately 20 feet per minute. At the same time the tubing 26 may make approximately 50 turns per minute in winding direction about the mandrel while the collar 52 may make approximately 300 r.p.m. in the same direction. The opening in the center of the collar 52 through which the tubing 26 passes, i.e., the sizing eye, designated 66, normally is smaller in diameter than the unsized diameter of the tubing 26, i.e., the outside diameter of the tubing as it comes off the mandrel. As a consequence, as the tubing passes through the sizing eye 66, it is reduced to the predetermined desired outside diameter thereof. The collar 52 turning at a rate which is substantially greater than that at which the tubing 26 turns frictionally grips the webs 24 and winds them tighter, thus reducing the diameter of the tubing 26. To further facilitate the operation, the tubing 26 is passed through the sizing eye 66 before the glue with which the webs 24 are coated dries.

Figure 6:
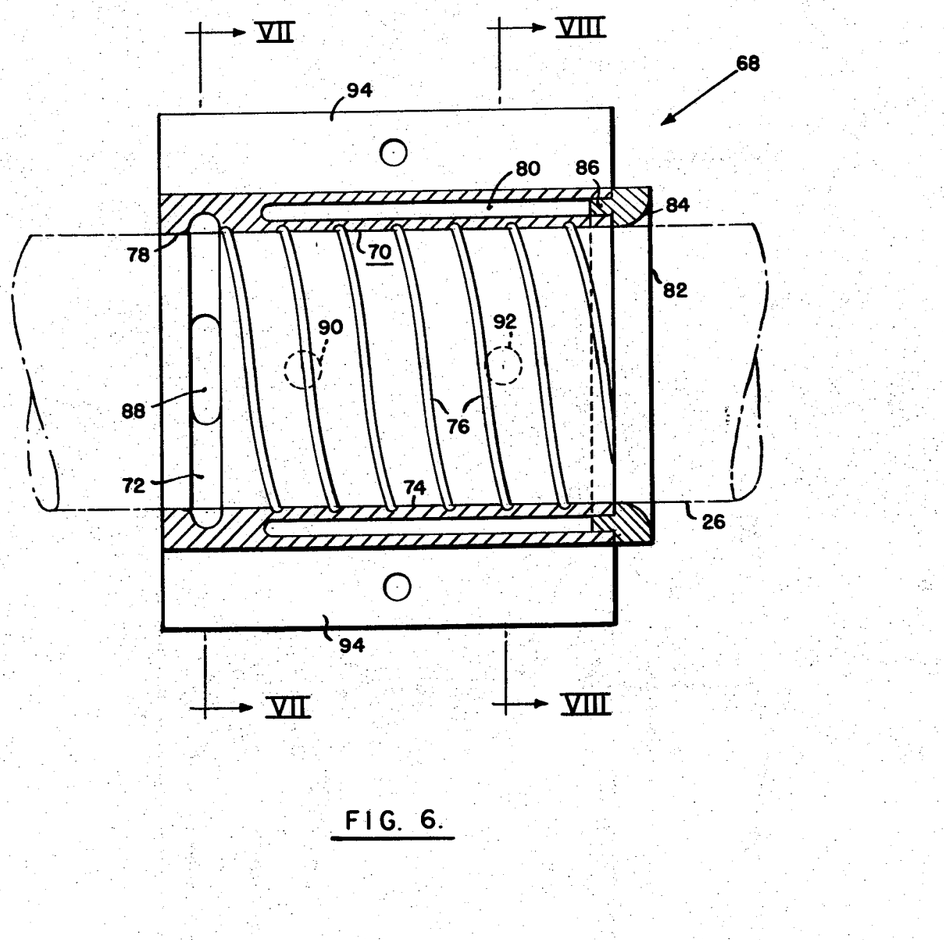
FIG. 6 is a vertical longitudinal section through the extruder attachment.
Figure 7:
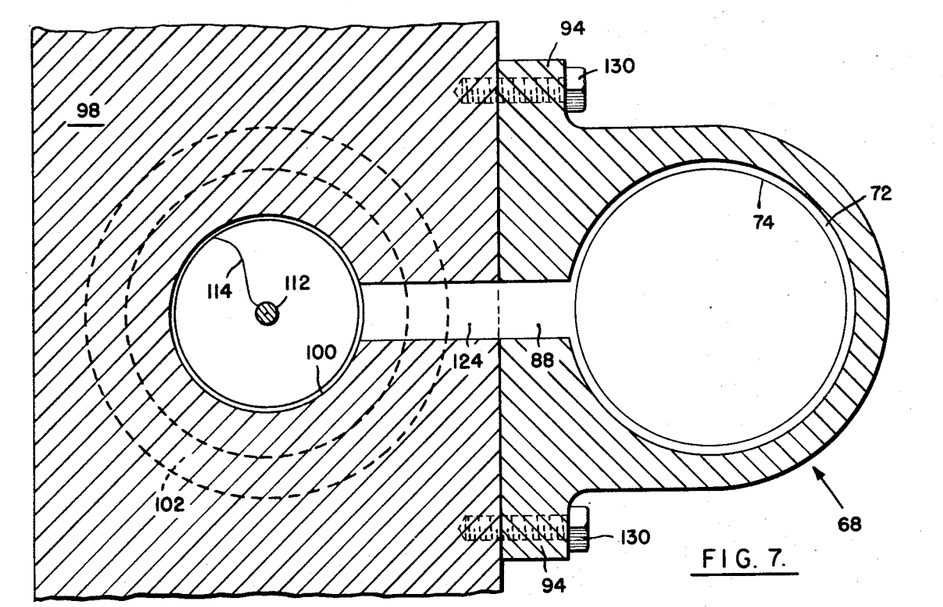
FIGS. 7 and 8 are sections respectively on lines VII—VII and VIII—VIII in FIG. 6.
Figure 8:
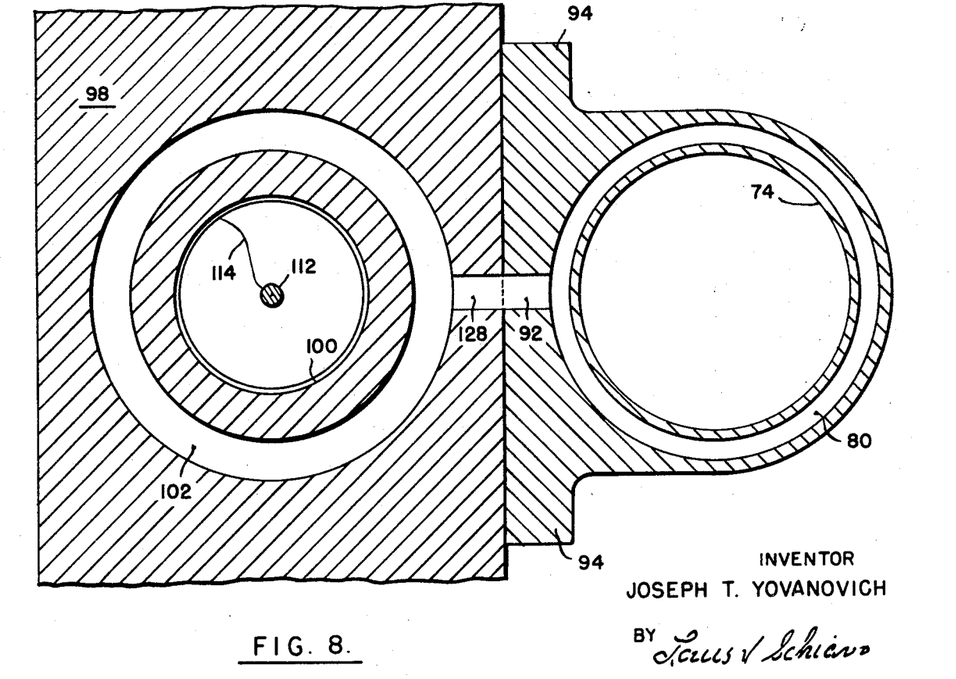

A substantial distance downstream from the tube sizing unit 28 (in the order of twenty feet) is an attachment 68 for receiving the sized tubing from the unit 28 and extruding plastic material thereabout in coating relation. The main body of the extruder attachment or extrusion eye means 68 is provided with a through opening 70. Close adjacent the downstream end of the opening is a narrow annular recess 72. The portion of the opening upstream from the recess 72, designated 74, is of a diameter corresponding to that of the sizing eye 66, and is provided with a multiplicity of spiral grooves 76 which extend parallel to the webs 24. The portion of the opening downstream from the recess 72, i.e., the extrusion eye itself, designated 78, is slightly greater in diameter, and, of course, is concentric with the portion 74 of the opening. The main body part extending about the portion 74 of the opening is hollowed out to provide a steam jacket 80, which is closed by an annular nose piece 82. The nose piece is provided with an inner periphery which is axially rounded, as at 84, and with a flange 86 extending axially into the jacket 80, as shown, to close the hollow. Extending radially from the recess 72 to the back of the attachment is a passage 88 provided for a purpose to appear, and extending radially from the steam jacket 80 to the back of the attachment are a pair of passages 90 and 92 provided for a purpose to appear. The attachment is provided with flanges 94 by means of which it is detachably mounted upon a unit for supplying the extruder attachment with plastic material, now to be described.

Figure 3:
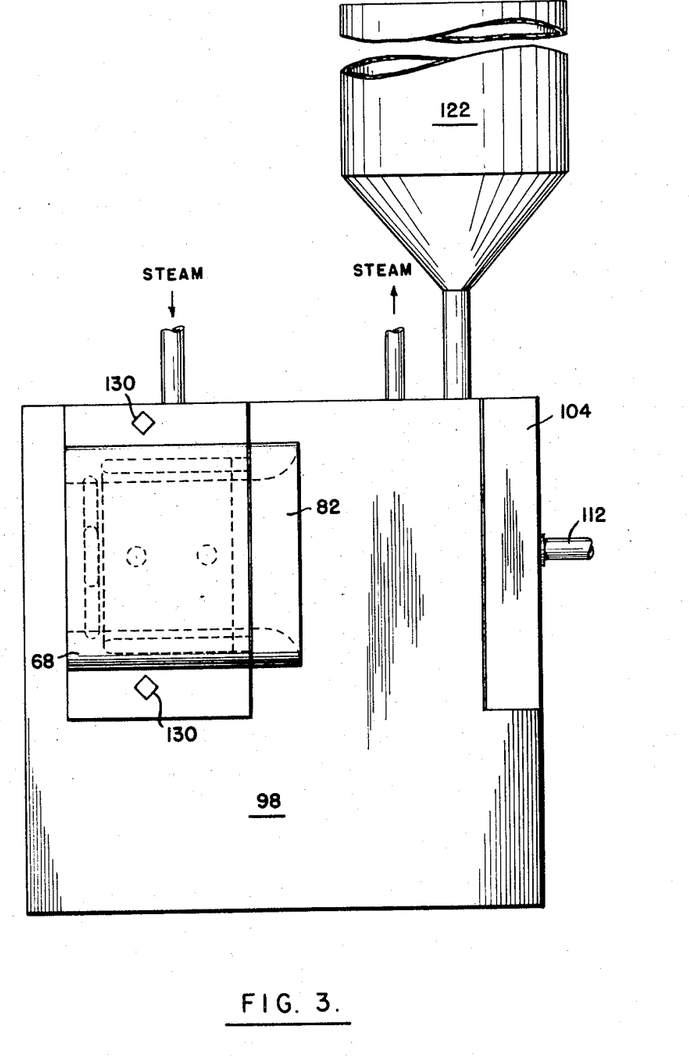
FIG. 3 is a side view of the extruder attachment shown in FIG. 1 and of the unit for supplying the same with plastic material.
Figure 4:
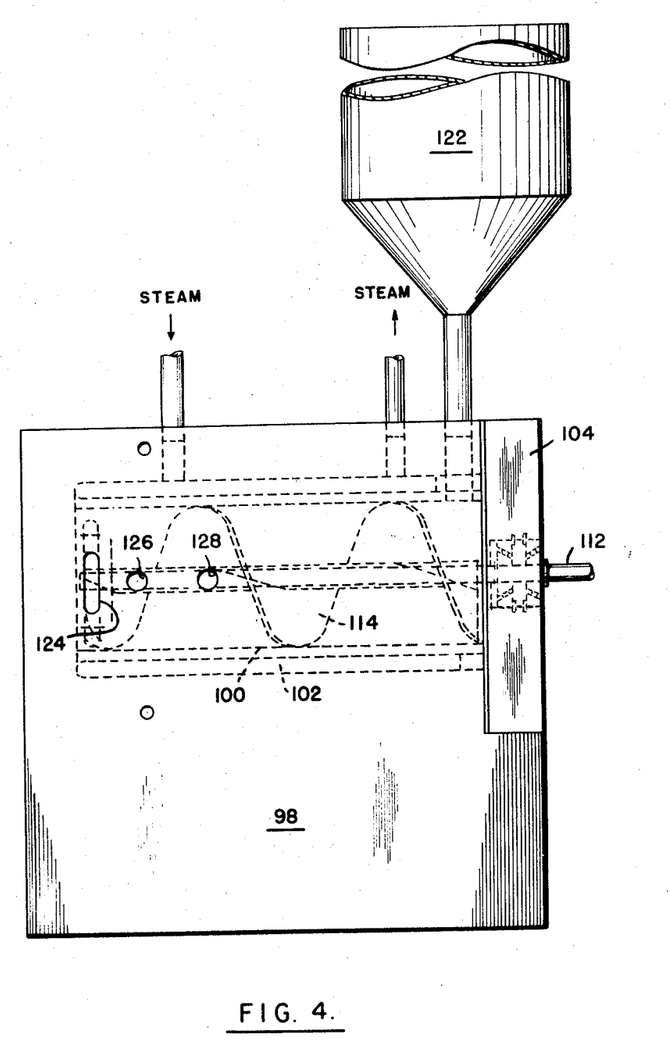
FIG. 4 is similar to FIG. 3, but the extruder attachment is omitted. Only the unit for supplying the extruder attachment with plastic material is shown.
Figure 5:
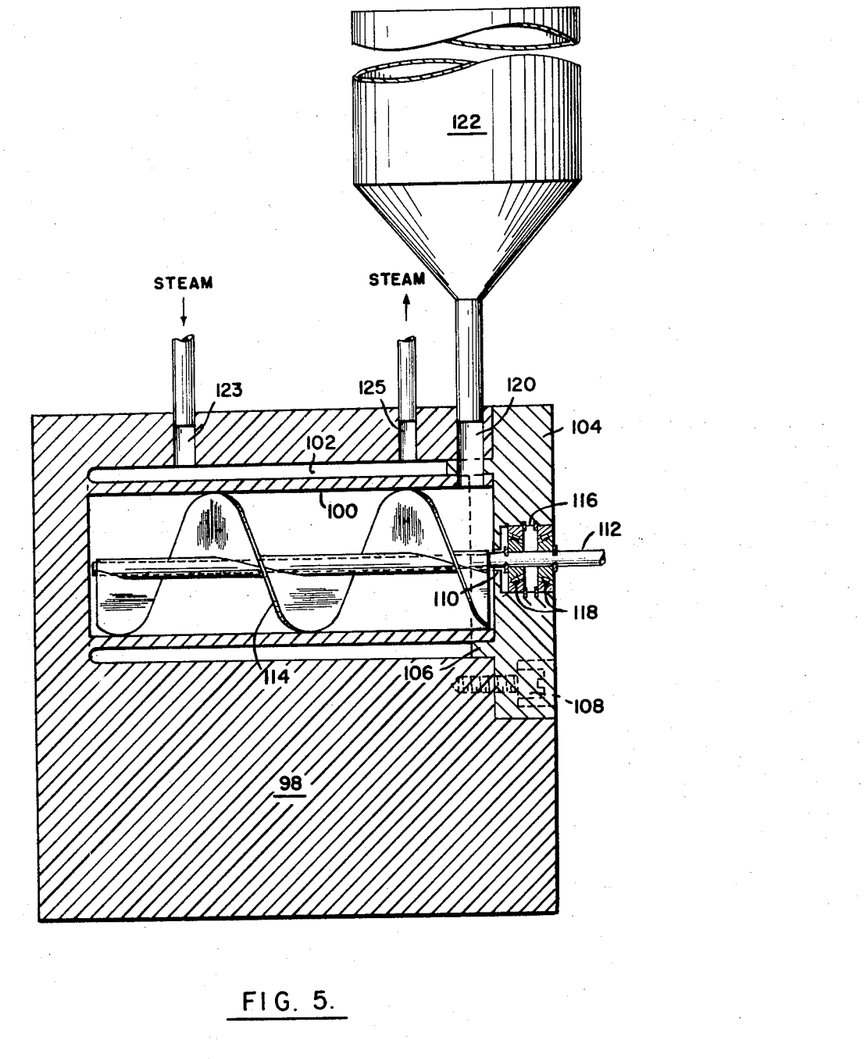
FIG. 5 is a vertical longitudinal section through the unit for supplying the extruder attachment with plastic material.

The unit, generally designated 96, is provided with a casing or main body 98 which may be affixed to the frame of a tube cut-off machine (not shown). The main body 98 is provided with a cylindrical chamber 100 extending deep into the upstream end thereof. The main body part extending about the chamber 100 is hollowed out to provide a steam jacket 102 which is closed by a plate 104. The plate is provided with a flange 106 extending axially into the jacket 102, as shown, to close the hollow, and studs 108 are provided for detachably affixing the plate 104 to the main body. Extending through a bore 110 in the plate 104 and into the cylindrical chamber 100 is a shaft 112 which mounts a helical screw 114. The bore 110 is counterbored, as at 116, to accommodate a pair of thrust bearings 118 arranged to secure the shaft 112 against axial movement. The diameter of the screw 114 corresponds closely to the diameter of the cylindrical chamber 100, and the shaft 112 and helical screw 114 terminate just short of the downstream end of the cylindrical chamber 100. Extending from the upstream end of the chamber 100 is a passage 120 opening on the top of the casing for connection to a receptacle 122, and extending from the steam jacket 102 are a pair of passages 123 and 125 opening on the top of the casing for connection to a source of steam. Extending from the downstream end of the chamber 100 is a passage 124 opening on the side of the casing, and extending from the steam jacket 102 are a pair of passages 126 and 128 opening on the side of the casing. The extruder attachment 68 is detachably affixed to the casing 98 by means of studs 130, and when it is fixed in position, the passage 124 registers with the passage 88 opening on the back of the extruder attachment, and the passages 126 and 128 register respectively with the passages 90 and 92 opening on the back of the extruder attachment.

Steam at a temperature of approximately 325° F. charged into the jacket 102 through the passage 123 is discharged therefrom through the passage 125. Since the jacket 80 is in communication with the jacket 102 through the passage 90 registering with the passage 126 and the passage 92 registering with the passage 128, the steam circulates about the jacket 80 as well as about the jacket 102. Thus the main body part extending about the chamber 100 in the casing 98, and the main body part extending about the through opening 70 in the extruder attachment 68 are maintained at an elevated temperature.

The receptacle 122 is kept charged with pellets of a suitable plastic material, for example, polyester resin. From the receptacle 122 the pellets drop by gravity through the passage 120 into the chamber 100. The helical screw 114, turning at a suitable rate, conveys the material to the opposite end of the chamber 100. However, by the time the material reaches the opposite end of the chamber 100 it has been reduced to a fluid state by the heat. The material is discharged from the chamber 100 through the registering passages 124 and 88 into the recess 72 on the upstream side of the extrusion eye 78. The upstream portion 74 of the through opening 70 in the extruder attachment 68 centers the tubing 26 relative to the extrusion eye 78, leaving an annular space extending about the tubing on the downstream side of the annular recess 72. Plastic material issuing from the chamber 100 keeps the recess 72 filled to capacity, and as the tubing advances the plastic material is extruded into the annular space aforesaid to form a coating thereof about the tubing. The spiral grooves 76 in the upstream portion 74 of the through opening 70 in the extruder attachment 68 are provided to reduce friction generated by passage of the tubing through the extruder attachment 68.

Operation of the screw 114 must be synchronized with operation of the spiral winding machine in order to control the supply of plastic material to the extrusion eye. For this purpose, for example, any suitable mechanical linkage between the shaft 112 and the operating parts of the spiral winding machine may be employed.

It will be understood that in effecting a change-over from fabrication of coated spiral tubing of one diameter to coated spiral tubing of another diameter only the mandrel 12 of the winding machine, the collar 52 of the tube sizing unit, and the extruder attachment 68 carried by the plastic material supply unit 96 need to be replaced by a mandrel, collar and extruder attachment of suitable size. The central longitudinal axis of these three pieces and of the work remain fixed in position regardless of the diameter of the tubing to be produced.

While in accordance with the provisions of the patent statutes, I have illustrated and described the best form of the embodiment of my invention now known to me, and described a specific method practiced therewith, it will be apparent to those skilled in the art that changes may be made in the same without departing from the spirit and scope of the invention as set forth in the appended claims, and in some cases certain features of my invention may be used to advantage without a corresponding use of other features. For example, the plastic material may be extruded with sufficient force to crush a thin walled spiral tube that is not supported internally. To prevent this from happening, the mandrel 12, unit 28 and attachment 68 may be relatively disposed in such a way that the mandrel extends through both the unit 28 and the attachment 68.

What is claimed is:

1. The combination comprising
   A. a frame,
   B. a cylindrical mandrel extending laterally from said frame in a downstream direction,
   C. means for continuously drawing a plurality of paper webs freshly coated with adhesive from a source thereof and winding the same about said mandrel thereby to form thereof spiral tubing and advancing said tubing along said mandrel and beyond the end thereof progressively in said downstream direction as it is formed,
   D. means downstream from said frame operable for sizing said tubing and thereby rendering the outside diameter thereof uniform including
      1. a collar provided with a sizing eye for receiving said tubing,
      2. means revolvably mounting said collar and aligning its sizing eye with said mandrel, and
      3. means for rotating said collar in tube winding direction,
   E. means downstream from said tube sizing means providing an extrusion eye for receiving the sized tubing, and
   F. means for supplying said extrusion eye with fluid plastic material for extrusion therefrom in coating relation to said sized tubing.

2. The combination according to claim 1 wherein the collar is axially fixed a substantial distance from the end of the mandrel.

3. The combination according to claim 2 wherein the collar is rotated at a rate substantially greater than that at which the tubing is wound.

4. The combination according to claim 1 wherein the collar is carried by a sleeve revolvable in antifriction bearing means, said collar, sleeve and antifriction means being coaxially related.

5. The combination according to claim 4 wherein the collar is operatively telescoped into the upstream end of the sleeve, and a pulley operable for rotating the sleeve is mounted on the downstream end of the sleeve.

6. The combination according to claim 1 wherein the tubing sizing means comprises
   A. a frame member disposed a substantial distance from the end of the mandrel,
   B. a sleeve extending downstream through an opening in said frame,
   C. antifriction bearing means within said opening and about said sleeve,
   D. a radially outwardly extending flange on said sleeve abutting an upstream face of said frame member,
   E. a collar having a centrally disposed axially extending sizing eye telescoped into the upstream end of said sleeve and aligned with said mandrel,
   F. a radially outwardly extending flange on said collar overlying the flange of said sleeve,
   G. a variable speed electric motor mounted on said frame,
   H. a drive pulley on said electric motor,
   I. a driven pulley on the downstream end of said sleeve abutting a downstream face of said frame member, and
   J. an endless belt trained about said pulleys and operable for rotating said sleeve and collar at a rate substantially greater than that at which the tubing is wound.

7. The combination comprising
   A. a frame,
   B. a cylindrical mandrel extending laterally from said frame in a downstream direction,
   C. means for continuously drawing a plurality of paper webs freshly coated with adhesive from a source thereof and winding the same about said mandrel thereby to form thereof spiral tubing and advancing said tubing along said mandrel and beyone the end thereof progressively in said downstream direction as it is formed,
   D. means downstream from said frame for receiving said tubing and operable for sizing the same to render the outside diameter thereof uniform,
   E. means downstream from said tube sizing means providing an extrusion eye for receiving the sized tubing, said extrusion eye means being provided with an opening extending longitudinally through the main body thereof, the surface of said opening being cylindrical and provided with an annular recess close spaced from the downstream end of the opening, the portion of the opening upstream from said recess being of a diameter corresponding to that of the sizing eye, and the portion of the opening downstream from said recess being of a diameter slightly greater than that of the sizing eye, and
   F. means for supplying said extrusion eye with fluid plastic material for extrusion therefrom in coating relation to said sized tubing, an opening extending radially outwardly from said recess through the wall of said main body being provided for placing the means for supplying fluid plastic material in communication with said recess and through said recess with said extrusion eye.

8. The combination according to claim 7 wherein the portion of the wall of the main body part upstream from the annular recess is hollowed out to thereby provide a steam jacket, and an opening is provided in said wall for placing said hollow in communication with a source of steam.

9. The combination according to claim 8 wherein the surface of that portion of the opening upstream from the annular recess is provided with a plurality of grooves which spiral thereabout in a direction corresponding to that in which the spiral tubing is wound.

10. The combination according to claim 9 wherein the spiral grooves extending about the surface of said opening are parallel to each other and to the paper webs of the spiral tubing which passes through the extrusion eye means.

11. The combination according to claim 7 wherein the main body of the extrusion eye means is hollowed out to thereby provide a steam jacket about the opening extending longitudinally therethrough, the main body of the means for supplying the extrusion eye with fluid plastic material is hollowed out to thereby provide a steam jacket about a cylindrical chamber, a shaft extends into said chamber through one end thereof, a helical screw within said cahmber is mounted on said shaft, said shaft and the screw mounted thereon are revolvable about the axis of said shaft, passages are provided in the main body of the means for supplying the extrusion eye with fluid plastic material for placing the steam jacket about the cylindrical chamber in communication with a source of steam, and for charging plastic material in a solid state into one end of said cylindrical chamber for being conveyed by said screw to the other end of said cylindrical chamber, and said extrusion eye means is detachably secured to said means for supplying the extrusion eye with fluid plastic material with registering passages for placing said cylindrical chamber in communication with said annular recess and for placing said steam jackets in communication.

* * * * *

UNITED STATES PATENT OFFICE
CERTIFICATE OF CORRECTION

Patent No. 3,755,046           Dated AUGUST 28, 1973

Inventor(s) JOSEPH T. YOVANOVICH

It is certified that error appears in the above-identified patent and that said Letters Patent are hereby corrected as shown below:

Column 1, line 13, "spriral" should read --spiral--.

Column 5, line 47 (Claim 6, line 2) "tubing" should be --tube--.

Column 6, lines 13 and 14, "beyone" should read --beyond--;

Column 6, line 63, "cahmber" should read --chamber--.

Signed and sealed this 2nd day of April 1974.

(SEAL)
Attest:

EDWARD M. FLETCHER, JR.          C. MARSHALL DANN
Attesting Officer                Commissioner of Patents